No. 878,271.
PATENTED FEB. 4, 1908.
J. C. BLACKFORD.
SEED CORN TREE.
APPLICATION FILED JUNE 3, 1907.
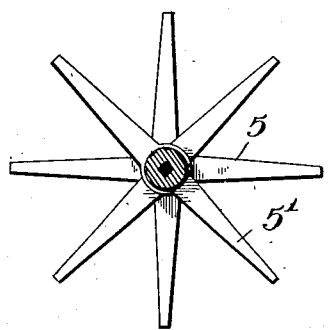
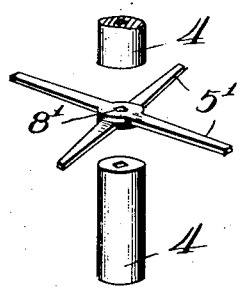
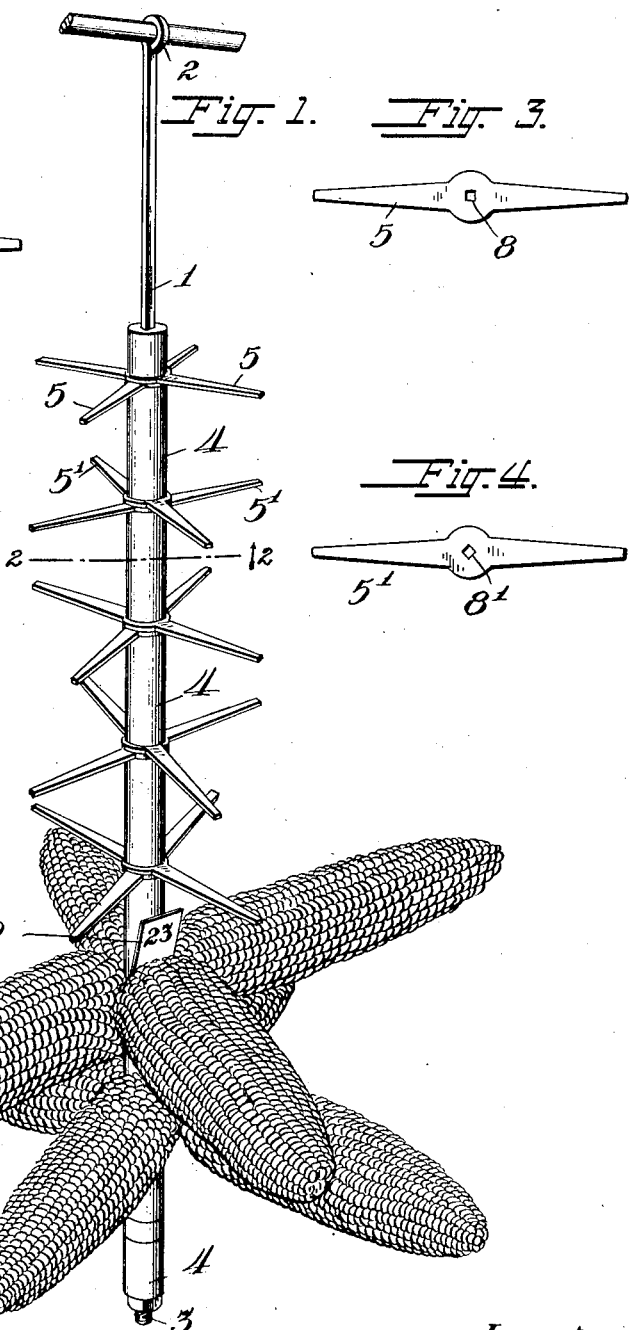
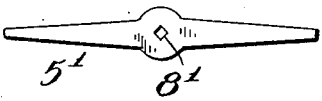
Witnesses
Inventor
James C. Blackford
By Albert N. Graves
Attorney.

UNITED STATES PATENT OFFICE.

JAMES C. BLACKFORD, OF CHICAGO, ILLINOIS.

SEED-CORN TREE.

No. 878,271.   Specification of Letters Patent.   Patented Feb. 4, 1908.

Application filed June 3, 1907. Serial No. 376,905.

*To all whom it may concern:*

Be it known that I, JAMES C. BLACKFORD, a citizen of United States, and a resident of the city of Chicago and county of Cook, State of Illinois, have invented certain new and useful Improvements in Seed-Corn Trees, of which the following is a specification.

This invention relates to improvements in seed corn trees and has among its salient objects to provide a device upon which a large number of ears can be readily supported upon a relatively small tree and stored in such a manner as to most perfectly preserve the vitality of the corn; to provide a construction adapted to be suspended in a barn or crib so that the corn may be safe from vermin; to provide a construction which affords most convenient accessibility to the ears without disturbing them upon their supports and also perfect ventilation for the ears; to provide means for properly identifying each ear; to provide a construction which can be easily assembled and disassembled and when not in use packed into a relatively small space for storage and for shipment, and in general to provide an improved construction of the character referred to.

I am aware that seed corn trees and racks have been heretofore patented but believe that none of them have embodied in a single structure the advantages of my construction and certainly not in a construction at once simple and economical of manufacture.

The invention will be readily understood from the following description reference being had to the accompanying drawings in which—

Figure 1 is a perspective view of my device assembled, and showing the manner of impaling the ears of corn upon the prongs. Fig. 2 is a sectional view taken through line 2—2 of Fig. 1 and looking upwardly. Figs. 3 and 4 are detailed views showing the different manner of arranging the eyes of the prong bars. Fig. 5 is a detail view showing the spools and prongs separated.

Referring to the drawings 1 designates the main supporting rod, rectangular in cross section and having an eye 2 at its upper end, and screw thread at its lower end to receive a confining nut 3. Upon this rod are adapted to be strung a series of spools or space blocks 4 which are longitudinally bored for this purpose. Between each pair of these spools is inserted a set of prongs, preferably four in number, and consisting of two sheet metal bars 5—5' arranged at right angles to each other. Each bar is centrally widened to form a head 7 through which is cut a rectangular eye 8 or 8' in order that the prong bars may be threaded on the rod 1.

It will be noted that in Fig. 3 the eye 8 is cut on the square in reference to the prongs 5, while in Fig. 4 the eye 8' is cut at an angle to the longitudinal axis of the prong.

The manner of arranging the prong bars 5 and 5' upon the rod constitutes one of the novel features of my device; the sets of prongs being so arranged that there will be eight vertical rows of prongs arranged symmetrically around the rod 1, as seen clearly in Fig. 2. To this end the pairs of bars are slipped upon the rod 1, each pair being spaced away from the succeeding pair by one of the cylindrical spools 4 but so assembled that each pair of bars having angularly-disposed eyes is alternated with a pair of bars having the eyes arranged on the square. It will thus be seen that the prongs will be arranged upon the rod 1 in eight vertical rows. This arrangement not only permits of the corn being more conveniently stuck upon the prongs but also affords much better access thereto for inspection or the removal of kernels and gives better ventilation than if the prongs were arranged in only four vertical rows. When the desired number of spools and prong bars are strung upon the rod they are held in place by simply screwing on the nut 3. The rod is then suspended above the floor of the crib by threading a supporting rod or wire through the eye 2 and supporting the rod or wire overhead.

The ears of the corn are then impaled upon the prongs for drying. In order to facilitate drying the pith may, if desired, be removed from the ear before it is stuck upon the prong, and inasmuch as the latter is flat and of increasing width towards its head the ear will be held firmly in place.

In order that each ear of corn may be properly identified for germinating-test and other purposes, the prongs of each rod are provided with suitable tags 10, each adapted at its lower end to fit upon a prong and project upwardly above the butt end of the ear when the latter is mounted upon the prong. This tag system is important in that it aids the farmer to select from, and indentify the grains with each ear, and plant them in a germinating test box properly laid off in sections corresponding to the number of ears.

It has come to be customary for farmers to select and transfer their seed corn with care and before planting in the spring, to select a definite number, say six or ten kernels from each ear, planting them in the germinating bed or box and then after germinating count the number of kernels from each ear which have germinated. In this manner the per cent. of fertility of each ear may be determined and such ears as fall below a satisfactory percentage of fertility are discarded.

It will be at once appreciated that in order to so test the ears of corn the group of kernels must be first selected from each ear and some necessary system of keeping such group identified with the ear adopted. By the use of my device the ears are so arranged that each is spaced away from all others and the most convenient access may be had thereto so as to select the kernels from various portions of the ear. Moreover the farmer can reach one part of the tree as well as the other because the ears are disposed symmetrically entirely around the tree. The presence of the tag associated with the prong and ear mounted thereon, obviously forms the most simple and practical expedient of identifying each ear; the idea being to give each tag and its ear a different identifying number. By lettering each separate tree or rack, where a number of trees are used, the farmer may readily distinguish each ear of corn without confusion.

An important feature of the invention is that the device is so constructed that it can be put together or taken apart with the greatest facility; that it requires no special means of fastening the parts together other than merely assembling them and that when in knocked down form it can be made into a bar like package which can be shipped with the greatest facility and with minimum liability of its becoming injured.

It will be obvious that the construction may be modified somewhat in the details thereof without departing from the spirit of the invention.

I claim as my invention:

1. In a seed corn tree, the combination with a rod forming the tree body, of a plurality of prong members loosely strung upon said rod, spacing members between said prongs also strung upon said rod, and means confining said prongs and spacing members in position upon said rod.

2. In a seed corn tree, the combination with a rod non-circular in cross-section, of a plurality of sets of prongs fitting, and non-rotatably mounted upon, said rod, and spacing devices between the several sets of prongs, each set comprising four prongs arranged at right angles to each other, the prongs of alternating sets extending in planes midway between the planes of the prongs of adjacent sets.

3. In a seed corn tree, the combination of a rod-like tree body provided with means for suspending it from above, a series of prong members removably mounted thereon, arranged in symmetrically disposed angular relation to each other and vertically spaced apart, and means confining said prongs in fixed relation to each other.

4. In combination with a seed corn tree having prongs the base end portions of which are non-circular in cross-section, of a series of tags adapted at their lower ends to fit upon said prongs and be held in upstanding position thereon.

5. In a seed corn tree, the combination of a rod-like tree body of uniform size and rectangular in cross-sectional form throughout its principal length, the crossed pairs of prong bars provided at their intersections with eyes fitting the tree body, the removable space spools interposed between the successive pairs of prong bars, and means for removably confining said spools and prong bars upon the tree body.

JAMES C. BLACKFORD.

Witnesses:
 EMILIE ROSE,
 LOIS FORCE.